United States Patent [19]
Van Slyke

[11] Patent Number: 5,696,058
[45] Date of Patent: Dec. 9, 1997

[54] SOLIDS-FREE, ESSENTIALLY ALL-OIL WELLBORE FLUID

[75] Inventor: Donald C. Van Slyke, Brea, Calif.

[73] Assignee: Union Oil Company of California, El Segundo, Calif.

[21] Appl. No.: 440,260

[22] Filed: May 12, 1995

Related U.S. Application Data

[63] Continuation of Ser. No. 55,510, Apr. 30, 1993, abandoned, which is a continuation-in-part of Ser. No. 948,509, Sep. 21, 1992, Pat. No. 5,556,832.

[51] Int. Cl.$^6$ .............................. C09K 7/06; E21B 29/00
[52] U.S. Cl. ............................................. 507/263; 166/297
[58] Field of Search ............................. 507/263; 166/297

[56] References Cited

U.S. PATENT DOCUMENTS

| | | |
|---|---|---|
| 2,319,660 | 5/1943 | Clark . |
| 2,347,983 | 5/1944 | Backoff et al. . |
| 2,674,756 | 4/1954 | Bilhartz et al. . |
| 2,764,546 | 9/1956 | Engle ................. 252/8.5 |
| 2,969,321 | 1/1961 | Carpenter ............ 252/8.5 |
| 3,172,473 | 3/1965 | Crowley et al. . |
| 3,276,519 | 10/1966 | Knox et al. . |
| 3,406,115 | 10/1968 | White . |
| 3,415,320 | 12/1968 | Young . |
| 3,437,146 | 4/1969 | Everhart et al. . |
| 3,554,288 | 1/1971 | Ross ..................... 166/305 |
| 3,554,289 | 1/1971 | Webb ................... 166/305 |
| 3,568,772 | 3/1971 | Gogarty et al. ....... 166/273 |
| 3,664,426 | 5/1972 | Chenevert . |
| 3,670,816 | 6/1972 | Chenevert . |
| 3,688,851 | 9/1972 | Chenevert . |
| 3,702,564 | 11/1972 | Chenevert . |
| 3,960,736 | 6/1976 | Free et al. . |
| 4,322,307 | 3/1982 | Kettner . |
| 4,330,414 | 5/1982 | Hoover . |
| 4,392,964 | 7/1983 | House et al. . |
| 4,404,107 | 9/1983 | Cowan et al. . |
| 4,423,781 | 1/1984 | Thomas . |
| 4,427,556 | 1/1984 | House et al. . |
| 4,428,843 | 1/1984 | Cowan et al. . |
| 4,434,075 | 2/1984 | Mardis et al. . |
| 4,434,076 | 2/1984 | Mardis et al. . |
| 4,435,564 | 3/1984 | House . |
| 4,439,333 | 3/1984 | House et al. . |
| 4,444,668 | 4/1984 | Walker et al. . |
| 4,465,601 | 8/1984 | Pastor, Jr. . |
| 4,476,032 | 10/1984 | House et al. . |
| 4,481,121 | 11/1984 | Barthel ................. 252/8.5 M |
| 4,528,104 | 7/1985 | House et al. ......... 252/8.5 M |
| 4,539,122 | 9/1985 | Son et al. . |
| 4,549,608 | 10/1985 | Stowe et al. . |
| 4,554,081 | 11/1985 | Borchardt et al. . |
| 4,582,614 | 4/1986 | House et al. . |
| 4,584,327 | 4/1986 | Sutton . |
| 4,595,511 | 6/1986 | Seybold et al. ...... 507/263 |
| 4,614,601 | 9/1986 | Sekimoto et al. . |
| 4,630,679 | 12/1986 | Reeves, III et al. . |
| 4,685,519 | 8/1987 | Stowe et al. . |
| 4,686,051 | 8/1987 | House et al. . |
| 4,725,372 | 2/1988 | Teot et al. . |
| 4,728,446 | 3/1988 | Doty et al. . |
| 4,784,778 | 11/1988 | Shin . |
| 4,787,453 | 11/1988 | Hewgill et al. . |
| 4,822,500 | 4/1989 | Dobson, Jr. et al. . |
| 4,828,725 | 5/1989 | Lai et al. . |
| 4,828,726 | 5/1989 | Himes et al. . |
| 4,883,124 | 11/1989 | Jennings, Jr. . |
| 4,900,456 | 2/1990 | Ogilvy ................. 166/297 |
| 4,938,288 | 7/1990 | Bridges . |
| 4,946,604 | 8/1990 | Smith . |
| 4,961,466 | 10/1990 | Himes et al. . |
| 4,971,709 | 11/1990 | Tillis et al. . |

FOREIGN PATENT DOCUMENTS

| | | |
|---|---|---|
| 0247801 | 12/1987 | European Pat. Off. . |
| 0254412 | 1/1988 | European Pat. Off. . |
| 0315987 | 5/1989 | European Pat. Off. . |
| 2108175 | 5/1983 | United Kingdom . |
| 2258258 | 2/1993 | United Kingdom . |

OTHER PUBLICATIONS

Linke, *Solubilities Inorganic and Metal–Organic Compounds*, 4th Edition, vol. II, American Chemical Society, Washington, D.C. (1965), pp. 1647, 1659–1662.

Comey et al., *A Dictionary of Chemical Solubilities Inorganic*, 2nd Edition, The MacMillan Co., New York (1921), 1119–1121.

*Completion, Workover, and Packer Fluids*, Halliburton Co., 1976.

Ezzat et al., Society of Petroleum Engineers, paper no. SPE 17161, 1968.

Milhone et al., Society of Petroleum Engineers, paper no. SPE 10030, 1982.

Journal of Petroleum Technology, Jan. 1985; U.S.A. pp. 137–142, P.A.–Boyd 'New Base Oil Used in Low–Toxicity Oil Muds'.

*Primary Examiner*—Philip Tucker
*Attorney, Agent, or Firm*—Gregory F. Wirzbicki; Shlomo R. Frieman

[57] ABSTRACT

A solids-free, essentially all-oil wellbore fluid comprises an organic fluid having (i) a melting point less than about 20° C. (about 68° F.), (ii) a flash point greater than about 54.4° C. (about 130° F.), and (iii) a dipole moment greater than 0 debye (D) and/or an aromatic solvent having a density at about 15.6° C. (60° F.) of at least about 0.9 g/ml (7.5 pounds per gallon (ppg)), a flash point of greater than about 54.4° C. (130° F.), a solubility in water at about 25° C. (77° F.) of less than about 1 weight percent, a solubility in benzene at about 25° C. (77° F.) of at least about 80 weight percent, and a pour point of less than about 15.6° C. (60° F.). Generally, a salt is dissolved in the organic fluid. The wellbore fluid is employed in well drilling, completion, and work-over operations.

14 Claims, No Drawings

SOLIDS-FREE, ESSENTIALLY ALL-OIL WELLBORE FLUID

CROSS-REFERENCE TO RELATED APPLICATIONS

This application is a continuation of application Ser. No. 08/055,510, filed Apr. 30, 1993, now abandoned which application is a continuation-in-part of application Ser. No. 07/948,509, filed Sep. 21, 1992, now U.S. Pat. No. 5,556,832 which continuation-in-part application is incorporated herein in its entirety by reference.

BACKGROUND

The present invention relates to (a) solids-free, non-aqueous wellbore fluids of variable high density, (b) methods for using such wellbore fluids during or after drilling to (i) complete and/or treat a production or injection well or (ii) treat and/or modify a subterranean formation, and (c) natural resource systems containing such wellbore fluids. (As used in the specification and claims, the term "wellbore fluid" means a fluid used while conducting pay zone drilling, underreaming, drilling in, plugging back, sand control, perforating, gravel packing, chemical treatment, hydraulic fracturing, cleanout, well killing, tubing and hardware replacement, and zone selective operations as well as a fluid employed as a packer fluid. The term "solids-free" is applied to the basic wellbore fluid having the desired specific gravity. As understood in the art, the term "solids-free" means that no solid material (e.g., weighting agents, viscosifiers, fluid loss control additives) is present in the wellbore fluid. Nevertheless, in certain cases, solid additives can be added to the wellbore fluid for specific purposes.)

Aqueous base completion fluids can cause swelling of clay-containing structures in a pay zone. For example, reservoir rocks containing volcanic ash and/or smectic or mixed layer clays could be permanently damaged if contacted with an aqueous base fluid. In addition, brine-in-oil emulsions can also cause clay swelling due to the internal water phase of the emulsion. Furthermore, the emulsifiers present in brine-in-oil emulsions can cause detrimental formation wettability changes.

Clean hydrocarbon oils (e.g., crude oil) are the least damaging completion fluids to be placed across an oil-bearing formation. See, for example, European Patent Application No. 87304548.8 and SPE 17161. Until recently, there was no oil-soluble material available to increase the density of the oil. See SPE 17161. However, European Patent Application No. 87304548.8 discloses that halogenated organic compounds (e.g., brominated aromatic ethers, diphenyls, aliphatic hydrocarbons, benzene, and alkyl benzenes) can be dissolved in an organic solvent such as crude oil, kerosene, diesel oil or a low toxicity drilling oil. Unfortunately, these halogenated hydrocarbons have several drawbacks. For example, they tend to be very costly, can be environmentally hazardous, and may cause adverse effects on downstream processing equipment (e.g., catalyst poisoning).

SUMMARY OF THE INVENTION

It would be desirable to have solids-free, non-aqueous completion or wellbore fluids that do not possess the disadvantages of the halogenated organic compounds of European Patent Application No. 87304548.8. Furthermore, it would be desirable to have a method for further increasing the density of the halogenated organic compounds disclosed in European Patent Application No. 87304548.8 to reduce the amount of such halogenated organic compounds (e.g., by further dilution with a hydrocarbon diluent) required in a well completion or work-over procedure.

The present invention provides (A) additional solids-free wellbore fluids, (B) drilling, well completion, and work-over methods employing such fluids, and (C) natural resource systems containing such fluids. In one embodiment of the present invention, the solids-free wellbore fluid comprises an aromatic solvent having a density at about 15.6° C. (60° F.) of at least about 0.9 g/ml (7.5 pounds per gallon (ppg)), a flash point of greater than about 54.4° C. (130° F.), a solubility in water at about 25° C. (77° F.) of less than about 1 weight percent, a solubility in benzene at about 25° C. (77° F.) of at least about 80 weight percent, a viscosity at about 37.8° C. (100° F.) of less than about 0.2 newton second/meter$^2$ (200 cps), and a pour point of less than about 15.6° C. (60° F.).

In another version of the invention, the wellbore fluid comprises an organic fluid. (As used in the specification and claims, the term "organic fluid" means a carbon-containing compound having (i) a melting point less than about 20° C. (about 68° F.), (ii) a flash point greater than about 54.4° C. (about 130° F.), and (iii) a dipole moment greater than 0 debye (D).) The organic fluid comprises one or more halogenated compounds (such as those described in European Patent Application No. 87304548.8) and/or one or more unhalogenated compounds. When a low density organic fluid is employed (e.g., an organic fluid having a density of less than about 1 g/ml (8.35 pounds per gallon (ppg)), a salt is generally dissolved in the organic fluid to increase the density of the organic fluid while enabling the organic fluid to remain solids-free. When a high density organic fluid is used (e.g., an organic fluid having a density of at least about 1 g/ml (8.35 ppg)), the organic fluid is commonly dissolved in a hydrocarbon diluent (e.g., the aromatic solvent) to increase the density of the hydrocarbon diluent.

Optionally, the wellbore fluids of the present invention further comprise the hydrocarbon diluent (e.g., crude oil, kerosene, diesel oil, polyalphaolefins (such as those described in U.S. Pat. No. 5,096,883, which patent is incorporated herein in its entirety by reference), mineral oil, gasoline, naphtha, aromatic solvents, and mixtures thereof) and/or an additive (e.g., acids, bases, buffers, viscosifiers, corrosion inhibitors, antioxidants, proppants for use in hydraulically fracturing subterranean formations, particulate agents for use in forming a gravel pack, organophilic clays, fluid loss control agents, and mixtures thereof).

The wellbore fluids of the present invention can be employed in virtually any well drilling or completion or work-over operation (e.g., pay zone drilling, underreaming, drilling in, plugging back, sand control, perforating, gravel packing, chemical treatment, hydraulic fracturing, cleanout, well killing, tubing and hardware replacement, and zone selective operations). In addition, the wellbore fluids can be used as a packer fluid.

Regarding the natural resource system of the present invention, such system comprises a subterranean formation (generally having present in at least a portion thereof a natural resource such as crude oil, natural gas, and/or a geothermal fluid), a well penetrating at least a portion of the subterranean formation, and the solids-free wellbore fluid present, for example, in at least a portion of the well and/or the subterranean formation.

DETAILED DESCRIPTION OF THE INVENTION

The organic fluid employed in the present invention preferably has a melting point less than about 16° C. (about 60° F.), more preferably less than about 10° C. (about 50° F.), even more preferably less than about 5° C. (about 41° F.), and most preferably less than about 0° C. (about 32° F.). The flash point of the organic fluid is preferably greater than about 60° C. (about 140° F.), more preferably greater than about 65.6° C. (about 150° F.), and most preferably greater than about 71.1° C. (about 160° F.). In the embodiments of the invention where a salt is dissolved in the organic fluid, the dipole moment of the organic fluid is preferably greater than about 0.5, more preferably greater than about 1, and most preferably greater than about 1.5 D. In general, when all other factors (e.g., cost, toxicity, melting and flash points) are the same and when a salt is dissolved in the organic solvent, it is preferred to employ the organic fluid having the highest dipole moment. When a salt is not dissolved in the organic fluid, the organic solvent need not have a high dipole moment and commonly has a density of at least about 1 g/ml (8.35 ppg), preferably at least about 1.05 g/ml (8.77 ppg), more preferably at least about 1.1 g/ml (9.19 ppg), even more preferably at least about 1.15 g/ml (9.60 ppg), and most preferably at least about 1.2 g/ml (10.02 ppg).

Generally, the organic fluid employed in the present invention has a solubility in 100 g of water at 25° C. (77° F.) of less than about 10, preferably less than about 5, more preferably less than about 1, and most preferably less than about 0.1 g. In fact, it is even desirable for the organic fluid to be substantially insoluble and even more desirable for the organic fluid to be virtually insoluble in 100 g water at 25° C. (77° F.). (As used in the specification and claims, the term "substantially insoluble" when used in conjunction with the solubility of the organic fluid in water means that less than about 0.01 g of the organic fluid is soluble in 100 g water at 25° C. (77° F.); and the term "virtually insoluble" when used in conjunction with the solubility of the organic fluid in water means that less than about 0.001 g of the organic fluid is soluble in 100 g water at 25° C. (77° F.).)

Exemplary classes of organic fluids for use in the present invention include, but are not limited to, aryl halides (usually containing about 6 to about 7 carbon atoms), heterocyclic compounds (generally containing about 5 to about 9 carbon atoms), alkyl halides (typically containing about 6 to about 8 carbon atoms), carboxylic acids (commonly containing about 4 to about 18 carbon atoms), amines (often containing about 6 to about 16 carbon atoms), esters (frequently containing about 6 to about 16 carbon atoms), alcohols (ordinarily containing about 6 to about 16 carbon atoms), aldehydes (commonly containing about 7 to about 8 carbon atoms), ketones (generally containing about 6 to about 12 carbon atoms), ethers (usually containing about 8 to about 14 carbon atoms), plant oils, and animal oils. The organic fluids are employed in the invention individually or in any combination thereof. Representative organic fluids are set forth in the following Table I:

TABLE I

| Representative Organic Fluids | |
|---|---|
| Class | Species |
| Aryl Halides | halotoluene[1], dihalotoluene, dihalobenzene, dihaloalkylbenzene[2] |
| Heterocyclic Compounds | furfural, quinoline |
| Alkyl Halides | octyl halide[1], cyclohexyl halide |
| Carboxylic Acids | valeric acid, caproic acid, heptanoic acid, octanoic acid, nonanoic acid, oleic acid, linoleic acid, linolenic acid, 2- |

TABLE I-continued

| Representative Organic Fluids | |
|---|---|
| Class | Species |
| | methyl propionic acid, 3-methyl butanoic acid |
| Amines | aniline, methyl aniline, dimethyl aniline, toluidine, anisidine, haloaniline[1], tripropylamine, triamyl amine, heptyl amine, dicylcohexyl amine, dibutylamine, tributyl amine, monobutyl diamylamine, octylamine, dioctylamine |
| Esters | 2-ethoxyethyl acetate, ethylene glycol diacetate, 2-butoxyethyl acetate, 2-ethylhexyl acetate, 2-(2-ethoxyethoxy)ethyl acetate, 2-(2-butoxyethoxy)ethyl acetate, glyceryl triacetate, 2,2,4-trimethyl pentanediol, diisobutyrate, glyceryl tributyrate, tributyl phosphate, dimethyl phthalate, diethyl phthalate, dipropyl phthalate, dibutyl phthalate, benzyl acetate, bis(2-ethylhexyl) adipate, undecanoic γ-lactone |
| Alcohols | hexanol, heptanol, octanol, nonanol, decanol, ethylhexanol, octanol, isoctyl alcohol, cyclohexanol, isodecanol, benzyl alcohol, phenylethanol, 3,5-dimethyl-1-hexanol, 2,2,4-trimethyl-1-pentanol, 2,6-dimethyl-4-heptanol, 3,3,5-trimethylhexanol, diacetone alcohol, furfuryl alcohol, 2-heptyl alcohol |
| Aldehydes | heptaldehyde, octanal, benzaldehyde, tolualdehyde, phenylacetaldehyde, salicylaldehyde, anisaldehyde, tetrahydrobenzaldehyde |
| Ketones | 2,5-hexanedione, 2,6,8-trimethyl isobutylheptylketone, butyrophenone, methyl heptyl ketone, cyclohexanone |
| Ethers | phenetole, hexyl ether, dibenzyl ether, butylphenyl ether, amyl phenyl ether, amyl benzyl ether, amyl tolyl ether, octyl phenyl ether, hexyl phenyl ether |
| Plant Oils | pine oil, linseed oil, canola oil, soybean oil, corn oil, peanut oil, rapeseed oil, sunflower oil, palm oil, olive oil |
| Animal Oils | Animal fats |

[1]Exemplary halides are bromine, chloride, and iodine.
[2]The alkyl group generally contains 1 to about 6 carbon atoms with about 2 carbon atoms being preferred.

The preferred organic fluids are esters and alcohols.

The salts dissolved in the organic fluid are generally inorganic salts. Exemplary inorganic salts include, but are not limited to, zinc halides, alkaline earth metal halides, cadmium halides, alkali metal halides, tin halides, arsenic halides, copper halides, aluminum halides, silver nitrate, mercury halides, mercuric cyanide, lead nitrate, copper sulfate, nickel halides, cobalt halides, manganese halides, and chromium halides. The preferred halides are chlorine, bromine, and iodine; the preferred alkali metals are lithium, sodium, potassium, rubidium, and cesium; and the preferred alkaline earth metals are magnesium, calcium, strontium, and barium. An individual salt as well as combinations of two or more salts are used in the wellbore fluid.

The concentration of the salt in the organic fluid depends on the desired density of the wellbore fluid. In general, any concentration of salt up to the solubility limit of the salt in the organic fluid can be used. Typically, the wellbore fluid contains at least about 0.1, preferably at least about 1, more preferably at least about 10, even more preferably at least about 25, and most preferably at least about 50, weight percent dissolved salt. (As used in the specification and claims, the term "weight percent" when used to designate the concentration of the dissolved salt in the wellbore fluid means the weight of the dissolved salt in the wellbore fluid divided by the sum of the weights of the organic fluid and dissolved salt in the wellbore fluid, the quotient being multiplied by 100 percent.) Quite often, the solubility limit of the salt in the wellbore fluid is less than about 75 weight percent, more typically less than about 50 weight percent, and usually less than about 25 weight percent.

In another embodiment of the present invention, the wellbore fluid comprises an aromatic solvent. In this version of the invention, the aromatic solvent generally has a density at about 15.6° C. (60° F.) of at least about 0.9 g/ml (7.5 ppg), preferably at least about 0.925 g/ml (7.72 ppg), more preferably at least about 0.95 g/ml (7.93 ppg), even more preferably at least about 0.975 g/ml (8.14 ppg), and most preferably at least about 1 g/ml (8.35 ppg). Typically, the aromatic solvent has a flash point greater than about 54.4° F. (about 130° F.), preferably greater than about 60° C. (about 140° F.), more preferably greater than about 65.6° C. (about 150° F.), and most preferably greater than about 71.1° C. (about 160° F.). The pour point of the aromatic solvent is usually less than about 15.6° C. (60° F.), preferably less than about 4.4° C. (40° F.), and more preferably less than about −6.7° C. (20° F.). Commonly, the aromatic solvent has a viscosity of less than about 0.2 newton second/meter$^2$ (N-sec/m$^2$) (200 cps), with the viscosity being preferably less than about 0.15 N-sec/m2 (150 cps), more preferably less than about 0.1 N-sec/m2 (100 cps), even more preferably less than about 0.05 N-sec/m2 (50 cps), and most preferably less than about 0.025 N-sec/m$^2$ (25 cps).

Regarding the solubility of the aromatic solvent in water and benzene, the solubility of the aromatic solvent in water at 25° C. (77° F.) is generally less than about 1, preferably less than about 0.5, more preferably less than about 0.25, and most preferably less than about 0.1 weight percent. In fact, it is even desirable for the aromatic solvent to be substantially insoluble and even more desirable for the organic fluid to be virtually insoluble in 100 g water at 25° C. (77° F.). (As used in the specification and claims, the term "substantially insoluble" when used in conjunction with the solubility of the aromatic solvent in water means that the solubility of the aromatic solvent in water at 25° C. (77° F.) is less than about 0.01 weight percent; and the term "virtually insoluble" when used in conjunction with the solubility of the aromatic solvent in water means that the solubility of the aromatic solvent in water at 25° C. (77° F.) is less than about 0.001 weight percent.)

In benzene at 25° C. (77° F.), the aromatic solvent has a solubility of generally at least about 80, preferably at least about 85, more preferably at least about 90, even more preferably at least about 95, and most preferably at least about 99 weight percent. In fact, it is preferred that the aromatic be completely miscible in benzene at 25° C. (77° F.).

Exemplary aromatic solvents meeting the above requirements are set forth in Mellan, *Handbook of Solvents*, Volume 1, Reinhold Publishing Corporation, New York, N.Y. (1957) and Mardsen, *Solvents Guide*, Second Edition, Interscience Publishers, A Division of John Wiley and Sons, Inc., New York, N.Y. (1963), both of these publications being incorporated in their entireties by reference. Preferred aromatic solvents include those listed in the following Table II:

TABLE II

| Aromatic Solvents | |
|---|---|
| Name | Description |
| PANASOL AN-3S[1] | Density of about 0.992 g/ml (8.28 ppg); boiling point range of about 210° to about 287.8° C. (410°–550° F.); flash point of about 87.8° C. (190° F.); an aromatic content of about 99%; containing substituted mono- and di-alkylnapthalenes. |
| PANASOL AN-3N[1] | Density of about 0.995 g/ml (8.31 ppg); boiling point range of about 232.2° to about 287.8° C. (450°–550° F.); flash point of about 85° C. (185° F.); an aromatic content of about 99%; containing substituted mono- and di-alkylnapthalenes. |
| SOLVENT H-T[2] | Density of about 0.994 g/ml (8.3 ppg); boiling point range of about 226.7° to about 390° C. (440°–734° F.); flash point of about 101.7° C. (215° F.); an aromatic content of about 75%. |
| AROMATIC SOLVENT 400[3] | Density of about 0.958 g/ml (8.0 ppg); boiling point range of about 207.2° to about 346.1° C. (405°–655° F.). |

[1].Available from Amoco.
[2].Available from AMSCO.
[3].Available from Texaco.

The wellbore fluids of the above invention embodiments optionally contain one or more additional ingredients such as hydrocarbon diluents, proppants suitable for use in hydraulically fracturing subterranean formations, particulate agents suitable for use in forming a gravel pack, corrosion inhibitors, acids, bases, buffers, viscosifiers, antioxidants, organophilic clays, and fluid loss control agents. Typical hydrocarbon diluents include, but are not limited to, crude oil, kerosene, diesel oil, polyalphaolefins, mineral oil, gasoline, naphtha, and aromatic solvents. In a preferred embodiment of the present invention, a high density organic fluid (e.g., an ester such as a dialkyl phthalate having 1 to about 4 carbon atoms) is dissolved in the hydrocarbon diluent.

The concentration of the hydrocarbon diluent in the wellbore fluid depends on the desired density of the wellbore fluid. Since the hydrocarbon diluent usually costs less than the organic fluid, it is usually desirable to use as much hydrocarbon diluent in the wellbore fluid as possible while achieving the desired density of the wellbore fluid. Generally, the hydrocarbon diluent is present in the wellbore fluid in a concentration of at least about 5, preferably at least about 10, more preferably at least about 25, even more preferably at least about 50 weight percent, and most preferably at least about 70 weight percent. (As used in the specification and claims, the term "weight percent" when used to designate the concentration of the hydrocarbon diluent in the wellbore fluid means the weight of hydrocarbon diluent in the wellbore fluid divided by the sum of the weights of the organic fluid, the dissolved salt, and the hydrocarbon diluent in the wellbore fluid, the quotient being multiplied by 100 percent.) While higher hydrocarbon diluent concentrations can be employed in the wellbore fluid, the wellbore fluid usually contains about 95 weight percent or less, commonly about 90 weight percent or less, more commonly about 85 weight percent or less, even more commonly about 80 weight percent or less, and most typically about 75 weight percent or less, hydrocarbon diluent.

When the hydrocarbon diluent is employed in conjunction with an organic fluid containing a dissolved salt, the dissolved salt-containing organic fluid is preferably miscible in the hydrocarbon diluent in at least the amount added to the hydrocarbon diluent. More preferably, the dissolved salt-containing organic fluid is miscible in the hydrocarbon diluent in all concentrations.

Common proppants suitable for use in hydraulic fracturing procedures are quartz sand grains, tempered glass beads, sintered bauxite, resin coated sand, aluminum pellets, and nylon pellets. Generally, the proppants are employed in the wellbore fluids of the present invention intended for use as hydraulic fracturing fluids and are used in concentrations of roughly about 1 to about 10 pounds per gallon of the wellbore fluid. The proppant size is typically smaller than about 2 mesh on the U.S. Sieve Series scale, with the exact size selected being dependent on the particular type of formation to be fractured, the available pressure and pumping rates, as well as other factors known to those skilled in the art.

Typical particulate agents employed in the wellbore fluids of the present invention used as gravel packing fluids include, but are not limited to, quartz sand grains, glass beads, synthetic resins, resin coated sand, walnut shells, and nylon pellets. The gravel pack particulate agents are generally used in concentrations of about 1 to about 20 pounds per gallon of the wellbore fluid. The size of the particulate agent employed depends on the type of subterranean formation, the average size of formation particles, and other parameters known to those skilled in the art. Generally, particulate agents of about 8 to about 70 mesh on the U.S. Sieve Series scale are used.

Some of the organic fluids (e.g., aniline) which can be employed in the present invention also function as corrosion inhibitors. When such dual acting organic fluids are used in the present invention, there is generally no need for an additional corrosion inhibitor. When such dual acting organic fluids are not employed in formulating the wellbore fluid or when an additional corrosion inhibitor is desired, the corrosion inhibitor selected can be an inorganic and/or organic compound.

Inorganic corrosion inhibitors include, but are not limited to, chromates (e.g., sodium chromate), phosphates (e.g., sodium phosphate), nitrites, silicates, borates, and arsenic. When used, the inorganic corrosion inhibitors are preferably present in the wellbore fluid in a concentration of at least about 0.0001, more preferably at least about 0.0005, and most preferably at least about 0.001, moles per liter of the wellbore fluid. The maximum concentration of the inorganic corrosion inhibitors in the wellbore fluid is generally less than about 0.1, preferably less than about 0.05, and more preferably less than about 0.01, moles per liter of the wellbore fluid.

Exemplary organic compounds capable of functioning as a corrosion inhibitor in the wellbore fluid of the present invention include, but are not limited to, pyridine, butylamine, benzoic acid, benzosulfonic acid, nonamethyleneamine, diphenyl urea, carbon disulfide, allylthiourea, octyldecylamine, and hexadecylamine. When employed in the wellbore fluid, the organic corrosion inhibitors are preferably present in a concentration of at least about 0.1, more preferably at least about 0.5, and most preferably at least about 1, weight percent based on the entire weight of the wellbore fluid. Typically, the maximum concentration of the organic corrosion inhibitor in the wellbore fluid is less than about 10, preferably less than about 5, and most preferably less than about 2.5, weight percent based on the entire weight of the wellbore fluid.

Acids, bases, and buffers are employed in the wellbore fluid to help maintain the dissolved salts in solution when the wellbore fluid is contacted by subterranean materials (e.g., water) having a pH capable of causing the precipitation of the dissolved salts. Some of the organic fluids employed in the present invention are acids (e.g., carboxylic acids) or bases (e.g., aniline, octylamine, quinoline) and, when used, generally negate the need for any additional acid or base, respectively. When acidic organic fluids are not used or when it is desired to use an additional acidic component in the wellbore fluid, the acid selected can be one or more inorganic and/or organic compounds. Common inorganic acids are hydrochloric acid, hydrobromic acid, hydrofluoric acid, nitric acid, phosphoric acid, orthophosphoric acid, sulfurous acid, sulfuric acid, boric acid, carbonic acid, chromic acid, hydroiodic acid, percholic acid, and alumic acid. Typical organic acids include oxalic acid, formic acid, caprylic acid, oleic acid, ascorbic acid, benzoic acid, butyric acid, lactic acid, acetic acid, and citric acid.

When basic organic fluids are not used or when it is desired to use an additional basic component in the wellbore fluid, the base selected can be one or more inorganic and/or organic compounds. Illustrative inorganic bases are hydroxides (e.g., ammonium, alkali, and alkaline earth metal hydroxides), bicarbonates (e.g., alkali bicarbonate), carbonates (e.g., alkali carbonates), lime, and ammonia. Exemplary organic bases are acetamide, ethylenediamine, hydrazine, pyridine, benzylamine, butylamine, thiazole, toluidine, and urea.

The buffering agents employed in the present invention generally have a buffering capacity in a least a portion of the pH range of about 6 to about 8, preferably about 6.5 to about 7.5, and most preferably about 6.8 to about 7.2. Buffer agents having a buffering capacity in at least a portion of the above pH ranges are set forth in Lange's Handbook of Chemistry, Editor: John A. Dean, 12th Edition, McGraw-Hill Book Co., New York, N.Y. (1979), pages 5–73 to 5–84, this publication being incorporated herein in its entirety by reference. More specifically, phosphates (e.g., potassium dihydrogen phosphate, disodium monohydrogen phosphate), phosphate-hydroxide combinations (e.g., potassium dihydrogen phosphate and sodium hydroxide), phosphate combinations (e.g., potassium dihydrogen phosphate and disodium monohydrogen phosphate), 2-(N-morpholino) ethanesulfonic acid-sodium hydroxide combinations, 2,2-bis(hydroxymethyl)- 2,2',2"-nitriloethanol-hydrochloric acid combinations, potassium dihydrogen phosphate-borax combinations, N-tris(hydroxymethyl)methyl-2-aminoethanesulfonic acid-sodium hydroxide combinations, triethanolamine-hydrochloric acid combinations, and diethylbarbiturate-hydrochloric acid combinations are some of the buffering agents having a buffering capacity within at least a portion of the aforementioned pH ranges.

The concentration of acid, base, or buffer employed in the wellbore fluid is dependent upon the subterranean conditions that the wellbore fluid is expected to encounter (e.g., the amount and pH of subterranean water expected to be in contact with the wellbore fluid). In general, when employed, the acid, base, or buffer is used in a concentration of at least about 0.01, preferably at least about 0.05, and more preferably at least about 0.1 weight percent based on the entire weight of the wellbore fluid. Typically, the maximum concentration of the acid, base, or buffer in the wellbore fluid is less than about 10, preferably less than about 5, and more preferably less than about 1 weight percent based on the entire weight of the wellbore fluid.

Exemplary antioxidants employed in the present invention are 2,6-ditertbutyl-p-cresol, butylated-hydroxy-anisole (BHA), butylated-hydroxy-toluene (BHT), tert-butylhydroquinone (TBHQ), o-cyclohexylphenol, and p-phenylphenol. When used, the antioxidants are generally present in the wellbore fluid in a concentration of at least about 0.0015, preferably at least about 0.01, and more preferably at least about 0.1, but typically less than about 10, preferably less than about 5, and more preferably less than about 1, weight percent based on the entire weight of the wellbore fluid.

Illustrative viscosifiers, organophilic clays, and fluid loss control (FLC) agents optionally used in the present invention as well as their general and preferred concentrations in the wellbore fluid are set forth in the following Table III.

TABLE III

Exemplary Viscosifiers, Clays, And FLC Agents

| Ingredient | Species | Concentration, v %[1] | |
|---|---|---|---|
| | | General | Preferred |
| Viscosifier | ethylene-propylene-diene monomer (EPDM) terpolymers, copolymers of isoprene and styrene sulfonate salt, copolymers of chloroprene and styrene sulfonate salt, copolymers of isoprene and butadiene, copolymers of styrene and styrene sulfonate salt, copolymers of butadiene and styrene sulfonate salt, copolymers of butadiene and styrene, terpolymers of isoprene, styrene, and styrene sulfonate salt, terpolymers of butadiene, styrene, and styrene sulfonate salt, butyl rubber, partially hydrogenated polyisoprenes, partially hydrogenated polybutylene, partially hydrogenated natural rubber, partially hydrogenated buna rubber, partially hydrogenated polybutadienes, Neoprene, polymeric fatty acids, hydroxylamine-esters, and aluminates | 0.02–2 | 0.05–1.5 |
| Organophilic Clay | amine-treated bentonite, hectorite, illite, and attapulgite | 0.5–10 | 1–5 |
| FLC Agent | asphaltics (e.g., asphaltenes and sulfonated asphaltenes), amine-treated lignite, amine-treated gilsonite, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid | 1–10 | 2–5 |

The salt-containing wellbore fluid of the present invention is prepared by dissolving the salt in the organic fluid, preferably with vigorous stirring. Generally, the salt is added slowly or incrementally to the organic fluid to allow the added salt to dissolve prior to adding any significant amount of additional salt. While heat can be employed to increase the dissolution rate of the salt in the organic fluid, it is preferred to not use heat in order to avoid potential detrimental chemical reactions and/or thermal degradation of the organic fluid. In addition, acids, bases, buffering agents, and antioxidants are typically added to the organic fluid either before, during, or after the addition of the salt.

When a hydrocarbon diluent is employed in a wellbore fluid comprising an organic fluid and a dissolved salt, the dissolved salt-containing organic fluid and hydrocarbon diluent are combined and any additional additive (e.g., hydraulic fracturing proppants, gravel pack particulate agents, viscosifiers, corrosion inhibitors, fluid loss control agents, and organophilic clays) is usually added to resulting combination. In those instances where a hydrocarbon diluent is not used, the additional additives are preferably added to the dissolved salt-containing organic fluid.

When a salt is not used as a weighting agent, the organic fluid and hydrocarbon diluent are combined and any additional additive (e.g., hydraulic fracturing proppants, gravel pack particulate agents, viscosifiers, corrosion inhibitors, fluid loss control agents, and organophilic clays) is usually added to resulting combination. In those instances where a hydrocarbon diluent is not used, the additional additives are preferably added to the organic fluid. In addition, when an aromatic solvent is employed as the wellbore fluid, any additional additives are typically added to the aromatic solvent.

The resulting wellbore fluid is preferably stored under conditions which prevent photochemical reactions (e.g., stored in dark glass or metal containers) and oxidation (stored in containers with little, if any, air space).

The specific techniques used when employing the wellbore fluid of this invention are determined by its intended use and are analogous to methodologies employed when using prior art wellbore fluids for corresponding well drilling or completion or work-over operations. For example, when the wellbore fluid is employed as a gravel packing fluid, it is typically injected into the formation in accordance with the procedure discussed in U.S. Pat. No. 4,552,215, this patent being incorporated herein in its entirety by reference.

When employed as a fracturing fluid, the wellbore fluid of the present invention is usually injected or pumped into the formation using procedures analogous to those disclosed in U.S. Pat. No. 4,488,975, U.S. Pat. No. 4,553,601, Howard et al., *Hydraulic Fracturing*, Society of Petroleum Engineers of the American Institute of Mining, Metallurgical, and Petroleum Engineers, Inc., New York, N.Y. (1970), and Allen et al., *Production Operations, Well completions, Workover, and Stimulation*, 3rd Edition, volume 2, Oil & Gas Consultants International, Inc., Tulsa, Oklahoma (1989) (Allen), chapter 8, these publications being incorporated herein in their entirety by reference.

When employed in a perforating operation, the wellbore fluid of the present invention is used according to the methodologies disclosed in chapter 7 of Allen, this publications having been incorporated herein in its entirety by reference.

Techniques for using packer fluids and well killing fluids, such as those discussed in chapter 8 of Allen, are also applicable to the wellbore fluid of the present invention.

EXAMPLES

The following examples are intended to illustrate, and not limit, the invention. Examples 1–27 demonstrate the dissolution of several salts in a variety of esters and Example 28 details the formation of a three-component wellbore fluid comprising (a) an organic fluid, (b) a dissolved salt, and (c) a hydrocarbon diluent. Example 29 sets forth the methodology employed in preparing a two-component system comprising (a) an organic fluid and (b) a hydrocarbon diluent. Core flow tests are detailed in Examples 30 (using the two-component system prepared in Example 29) and 31 (employing a single-component system, namely, an aromatic solvent).

EXAMPLES 1–27

Dissolution of Salt In Esters

A salt (either $CaBr_2$, $ZnBr_2$, or $ZnCl_2$) was dissolved in each of nine different ester samples to determine the approximate solubility limits and the viscosities of the resulting fluids. Each salt was weighed out in about 0.5 g increments and then placed in a 50 ml beaker containing about 5 g of one of the esters. The samples were heated on a hot plate to about 65.6° C. (about 150° F.) to speed up the dissolution of the respective salt. Observations (e.g., rate of dissolution and sample color and texture) were recorded. The resulting fluids were cooled to room temperature and the viscosity of each such fluid was determined at about 24.4° C. (about 76° F.) in a capillary viscometer. Visual observation of the rate of dissolution was used to roughly determine whether a saturated solution was obtained. The results of this experiment are shown below in Table A.

TABLE A

| Ester Salt | Vis[1], cp | ρ, lb/gal | NS[2] | [ ][3], g | Observations |
|---|---|---|---|---|---|
| Isobutyl Isobutyrate | | | | | |
| $CaBr_2$ | N/A[4] | N/A | N/A | N/A | Solidified |
| $ZnBr_2$ | 20 | 11.1 | yes | 4 | Dissolved Slowly |
| $ZnCl_2$ | 280 | 9.7 | yes | 3 | Dissolved Slowly |
| 2-Ethoxyethyl Acetate | | | | | |
| $CaBr_2$ | N/A | N/A | N/A | N/A | Reacted Chemically |
| $ZnBr_2$ | 300 | 12.3 | no | 3.9 | Dissolved Quickly |
| $ZnCl_2$ | 55 | 9.8 | no | 1.8 | |
| Ethyl Caproate | | | | | |
| $CaBr_2$ | 108 | 9.2 | no | 2 | Turned Cloudy |
| $ZnBr_2$ | 108 | 12.0 | no | 5 | Dissolved Quickly |
| $ZnCl_2$ | 20 | 9.2 | no | 2.2 | |
| Ethylhexyl Acetate | | | | | |
| $CaBr_2$ | 135 | 9.2 | yes | 2 | Turned Yellow, $CaBr_2$ Settled Out |
| $ZnBr_2$ | 405 | 12.1 | no | 5 | Dissolved Quickly |
| $ZnCl_2$ | 35 | 9.1 | no | 2 | Dissolved Slowly |
| 2-(2-Ethoxyethoxy) ethyl Acetate | | | | | |
| $CaBr_2$ | N/A | 10.2 | yes | 1.7 | Reacted, Formed Two Phases |
| $ZnBr_2$ | 428 | 13.6 | no | 5 | Dissolved Quickly |
| $ZnCl_2$ | >1200 | 11.4 | yes | 3.3 | Turned Yellow, Dissolved Slowly |
| 2-(2-Butoxyethoxy) ethyl Acetate | | | | | |
| $CaBr_2$ | 26 | 9.1 | yes | 0.8 | Dissolved Slowly, Turned Orange |
| $ZnBr_2$ | 710 | 13.3 | no | 5 | Turned Yellowish |
| $ZnCl_2$ | 50 | 9.8 | yes | 1.7 | Dissolved Slowly |
| Tributyl Phosphate | | | | | |
| $CaBr_2$ | >1200 | 10.2 | yes | 2 | Dissolved Quickly, Turned Yellow |
| $ZnBr_2$ | 65 | 11.9 | no | 3.5 | Dissolved Slowly |
| $ZnCl_2$ | 53 | 10 | yes | 2 | Dissolved Slowly |
| Diethyl Phthalate | | | | | |
| $CaBr_2$ | N/A | N/A | N/A | N/A | Solidified |
| $ZnBr_2$ | >1200 | 13.4 | no | 3.6 | Dissolved Quickly |
| $ZnCl_2$ | 108 | 10.5 | no | 1.1 | |
| Dibutyl Phthalate | | | | | |
| $CaBr_2$ | 157 | 9.9 | yes | 1 | White Opaque Color |
| $ZnBr_2$ | 165 | 10.6 | no | 1.5 | Dissolved Slowly |
| $ZnCl_2$ | 165 | 9.8 | no | 1 | Dissolved Slowly |

[1]"Vis" denotes viscosity.
[2]"NS" denotes nearly saturated.
[3]"[ ]" denotes the weight of the salt dissolved in the ester.

The data shown in Table A indicates that various salts can be dissolved in organic fluids to form a wellbore fluid having a higher density than the respective constituent organic fluids.

EXAMPLE 28

Zinc Bromide-Containing n-Octanol in Diesel Diluent

At ambient room temperature (about 20.1° C. (about 70° F.)), anhydrous zinc bromide (about 100 g) was added to about 100 g n-octanol in about 20 g increments while stirring the sample vigorously with a stirring bar. After the zinc bromide was completely dissolved, about 250 g of No. 2 diesel diluent were added to the zinc bromide-containing n-octanol using gentle mixing. The resulting wellbore fluid (about 450 g) had a density of about 8.5 pounds per gallon.

The above Example 28 demonstrates that salts can be dissolved in an organic fluid and the resulting combination diluted with a hydrocarbon diluent.

EXAMPLE 29

Preparation of Two-Component System

At ambient room temperature (about 21.1° C. (70° F.)), diethyl phthalate (about 315 g) was added to kerosine (about 185 g) gradually in about 30 g increments while vigorously stirring the sample with a stirring bar. The resulting wellbore fluid (about 500 g) had a density of about 1.018 g/ml (8.5 ppg).

EXAMPLE 30

Core Flow Test Employing a Two-Component System

Core Sample

The core sample employed in this experiment was a water-sensitive West Foreland core having the following approximate characteristics:

| | |
|---|---|
| Air permeability | 100 md |
| Porosity | 20–22% |
| Medium Grain Sand | |
| Pore Lining Smectite | 2–3% |

Test Protocol

Kerosine (87 pore volumes) were flowed through the core at ambient conditions using a pressure differential of about 30 psi. The flow rate was allowed to line out. After the flow rate lined out, the two-component system prepared in Example 29 (about 32 pore volumes) was flowed through the core using a pressure differential of about 30 psi. The flow rate was again allowed to line out. Finally, kerosine was again flowed through the core using a pressure differential of about 30 psi and the flow rate was also allowed to line out to obtain the return permeability.

Test Results

The kerosine flow rate prior to passing the two-component system through the core was about 3.7 cc/min and after passing the two-component system through the core was about 3.5 cc/min. Hence, the return permeability was about 95%.

EXAMPLE 31

Core Flow Test Employing An Aromatic Solvent

Core Sample

Same as employed in Example 30.

Test Protocol

Kerosine (121 pore volumes) were flowed through the core at ambient conditions using a pressure differential of about 30 psi. PANASOL AN-3S brand aromatic solvent (about 82 pore volumes) was flowed through the core using a pressure differential of about 30 psi. Finally, kerosine (about 47 pore volumes) was again flowed through the core using a pressure differential of about 30 psi to obtain the return permeability.

Test Results

The kerosine flow rate prior to passing the PANASOL AN-3S brand aromatic solvent through the core was about 5.1 cc/min and after passing the PANASOL AN-3S brand aromatic solvent through the core was about 5.0 cc/min. Hence, the return permeability was about 98%.

Although the present invention has been described in detail with reference to some preferred versions, other versions are possible. For example, in another version of the invention, the organic fluid is employed as the wellbore fluid in well drilling or completion or work-over operations, with or without one or more of the optional additives (e.g., hydrocarbon diluents, hydraulic fracturing proppants, gravel pack particulate agents, corrosion inhibitors, acids, bases, buffers, viscosifiers, antioxidants, organophilic clays, and fluid loss control agents). Therefore, the spirit and scope of the appended claims should not necessarily be limited to the description of the preferred versions contained herein.

What is claimed is:

1. A method for the completion or work-over of a well comprising the step of perforating in the presence of a completion or work-over fluid, the method being characterized in that the fluid comprises:

(a) an alkyl naphthalene-containing aromatic solvent having a density at about 15.6° C. (60° F.) of at least about 0.9 g/ml (7.5 pounds per gallon (ppg)), a flash point of greater than about 54.4° C. (130° F.), a solubility in water at about 25° C. (77° F.) of less than about 1 weight percent, a solubility in benzene at about 25° C. (77° F.) of at least about 80 weight percent, a viscosity at about 37.8° C. (100° F.) of less than about 0.2 newton second/meter² (200 cps), and a pour point of less than about 15.6° C. (60° F.); and (b) a dialkyl phthalate having a solubility in benzene at about 25° C. (77° F.) of at least about 80 weight percent, a density at about 15.6° C. (60° F.) of at least about 1 g/ml (8.35 pounds per gallon (ppg)), and the formula

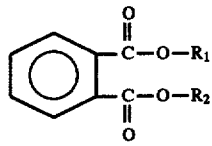

wherein $R_1$ and $R_2$ are independently selected from the group consisting of alkyl groups containing 1 to 4 carbon atoms.

2. The method of claim 1 wherein the dialkyl phthalate comprises dimethyl phthalate.

3. The method of claim 1 wherein the dialkyl phthalate comprises diethyl phthalate.

4. The method of claim 1 wherein the dialkyl phthalate comprises dipropyl phthalate.

5. The method of claim 1 wherein the dialkyl phthalate comprises dibutyl phthalate.

6. A method for the completion or work-over of a well comprising the step of perforating in the presence of a completion or work-over fluid, the method being characterized in that the completion or work-over fluid is non-aqueous and devoid of solids and comprises a dialkyl phthalate having a solubility in benzene at about 25° C. (77° F.) of at least about 80 weight percent, a density at about 15.6° C. (60° F.) of at least about 1 g/ml (8.35 pounds per gallon (ppg)), and the formula

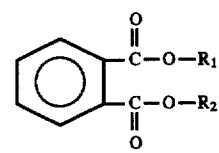

wherein $R_1$ and $R_2$ are independently selected from the group consisting of alkyl groups containing 1 to 4 carbon atoms.

7. The method of claim 6 wherein the dialkyl phthalate has a melting point less than about 16° C. (60° F.).

8. The method of claim 6 wherein the dialkyl phthalate has a flash point greater than about 60° C. (140° F.).

9. A method for the completion or work-over of a well comprising the step of perforating in the presence of a completion or work-over fluid, the method being characterized in that the fluid is non-aqueous and comprises an alkyl naphthalene having a density at about 15.6° C. (60° F.) of at least about 0.9 g/ml (7.5 pounds per gallon (ppg)), a flash point of greater than about 54.4° C. (130° F.), a solubility in water at about 25° C. (77° F.) of less than about 1 weight percent, a solubility in benzene at about 25° C. (77° F.) of at least about 80 weight percent, a viscosity at about 37.8° C. (100° F.) of less than about 0.2 newton second/meter² (200 cps), an aromatic content of at least about 75 percent, a boiling point range which includes, as part of the range, the temperature of 247.8° C. (478° F.), and a pour point of less than about 15.6° C. (60° F.).

10. The method of claim 6 wherein the fluid further comprises a hydrocarbon diluent.

11. The method of claim 6 wherein the fluid further comprises a hydrocarbon diluent selected from the group consisting of crude oil, kerosene, diesel oil, polyalphaolefins, mineral oil, gasoline, and naphtha.

12. The method of claim 1 wherein the aromatic solvent has an aromatic content of at least about 75 percent.

13. The method of claim 1 wherein the aromatic solvent has a boiling point range which includes, as part of the range, the temperature of 247.8° C. (478° F.).

14. The method of claim 1 wherein the fluid is non-aqueous.

* * * * *

UNITED STATES PATENT AND TRADEMARK OFFICE
CERTIFICATE OF CORRECTION

PATENT NO. : 5,696,058
DATED : December 9, 1997
INVENTOR(S) : Donald C. Van Slyke It is certified that error appears in the above-indentified patent and that said Letters Patent is hereby corrected as shown below:

column 6, line 24, after "AMSCO" insert -- , comprises alkyl naphthalene, and has 10% and 50% points of the distillation range at 247.8°C (478°F) and 268.9°C (516°F), respectively --.

Signed and Sealed this

Twenty-fourth Day of November, 1998

Attest:

BRUCE LEHMAN

Attesting Officer     Commissioner of Patents and Trademarks